United States Patent [19]

Kan

[11] Patent Number: 4,715,780
[45] Date of Patent: Dec. 29, 1987

[54] WATER PUMP

[75] Inventor: Yoshiro Kan, Fujisawa, Japan

[73] Assignee: Nippon Seiko Kabushiki Kaisha, Tokyo, Japan

[21] Appl. No.: 771,119

[22] Filed: Aug. 30, 1985

[30] Foreign Application Priority Data

Sep. 10, 1984 [JP] Japan .............. 59-136138[U]

[51] Int. Cl.$^4$ .............................................. F04D 29/08
[52] U.S. Cl. ..................... 415/170 A; 384/492; 384/536; 464/93
[58] Field of Search ........... 415/170 R, 170 A, 200; 384/492, 537, 584, 477, 494, 908, 909, 536, 585, 582; 308/DIG. 7; 416/174; 464/93, 178

[56] References Cited

U.S. PATENT DOCUMENTS

| | | | |
|---|---|---|---|
| 845,632 | 2/1907 | Gurney | 384/492 |
| 3,163,475 | 12/1964 | Litsky | 308/DIG. 7 |
| 3,415,500 | 12/1968 | Pethis | 384/536 |
| 3,722,968 | 3/1973 | Bomberger | 384/492 |
| 3,846,045 | 11/1974 | Mincuzzi | 415/119 |
| 3,923,350 | 12/1975 | Berry | 384/494 |
| 3,981,610 | 9/1976 | Ernst et al. | 415/170 A |
| 4,172,310 | 10/1979 | Mincuzzi | 415/170 A |
| 4,489,992 | 12/1984 | Brandenstein et al. | 384/536 |

FOREIGN PATENT DOCUMENTS

| | | | |
|---|---|---|---|
| 972708 | 2/1951 | France | 464/93 |
| 124819 | 7/1983 | Japan | 384/907 |
| 124820 | 7/1983 | Japan | 384/907 |
| 59-592 | 1/1984 | Japan . | |
| 1054075 | 1/1967 | United Kingdom | 464/93 |
| 1476348 | 6/1977 | United Kingdom . | |

Primary Examiner—Robert E. Garrett
Assistant Examiner—John T. Kwon
Attorney, Agent, or Firm—Shapiro and Shapiro

[57] ABSTRACT

A water pump comprises a rotary shaft having a water circulating impeller fixed to one end thereof and a rotative driving pulley fixed to the other end thereof, a housing made of resin and having an outer shell portion covering the portion of the rotary shaft between the opposite ends thereof and a mounting portion extending radially outwardly from the outer periphery of the outer shell portion which is proximate to the impeller, a plurality of rolling members disposed between the rotary shaft and the housing to enable rotation of the rotary shaft, an outer race disposed between the housing and the rolling members and providing an outer track surface for the rolling members, and seals for preventing entry of foreign substances from the axial opposite ends of the outer race.

14 Claims, 4 Drawing Figures

WATER PUMP

BACKGROUND OF THE INVENTION

1. Field of the Invention

This invention relates to a water pump for circulating engine cooling water in an automotive vehicle or the like.

2. Description of the Prior Art

Water pumps for circulating engine cooling water which have heretofore been widely used are generally of a structure in which an impeller is disposed on a portion of a rotary shaft rotatably supported in a housing fixed to an engine block through a bearing portion which extends into the engine block, and a pulley is disposed on the opposite side. The bearing portion is formed by an inner race, an outer race and rolling members interposed therebetween.

In recent years, due to the necessity of making the vehicle lightweight and making the vehicle compact for the saving of space, development of a compact, lightweight water pump has been desired, and an example, of such a pump is disclosed in Japanese Laid-open Utility Model Application No. 592/1984. The water pump described in said publication has achieved a reduction in number of parts and compactness by forming a rotary shaft 102 integrally with a pulley and forming a housing 104 and an outer race for a bearing integrally with each other, as shown in FIG. 4 of the accompanying drawings.

However, in the water pump described in the aforementioned publication, the housing 104 has a track surface for the rolling members 103 of the bearing and therefore must be made of steel for bearing against the rotating members. In this case, the housing 104 contacts the engine cooling water and the water entering the engine compartment and suffers from the problem of rusting. Therefore, it is necessary to subject the housing to a special surface treatment in order to prevent rusting. Further, since the housing 104 is formed of steel which has a specific gravity greater than aluminum heretofore used, no significant improvement can be obtained in terms of reducing the weight.

Also, the dimensions of the mounting portion of the housing 104 with respect to the engine body differ from vehicle to vehicle. Therefore, the housing 104 must be set in conformity with each vehicle individually even though the dimensions of the track portion of the bearing can be made common, and this is unsuitable for mass production.

SUMMARY OF THE INVENTION

It is an object of the present invention to provide a water pump which can be made compact and lightweight while maintaining the bearing portion common to a range of vehicles.

The present invention has been devised to solve the above-noted problems and provides a water pump comprising a rotary shaft having a water circulating impeller fixed to one end thereof and a rotative driving pulley fixed to the other end thereof, a housing made of resin and having an outer shell portion covering the portion of said rotary shaft between the opposite ends thereof and a mounting portion extending radially outwardly from the outer periphery of said outer shall portion which is proximate to said impeller, a plurality of rolling members disposed between said rotary shaft and said housing to enable rotation of said rotary shaft, an outer race disposed between said housing and said rolling members and providing an outer track surface for said rolling members, and seal means for preventing entry of foreign substances from the axial opposite ends of said outer race.

The water pump of the present invention achieves compactness and reduced weight by the housing made of resin while forming the bearing portion by parts common to a diversity of vehicles.

DESCRIPTION OF THE PREFERRED EMBODIMENTS

Some embodiments of the present invention will hereinafter be described with reference to the drawings.

Figure 1:
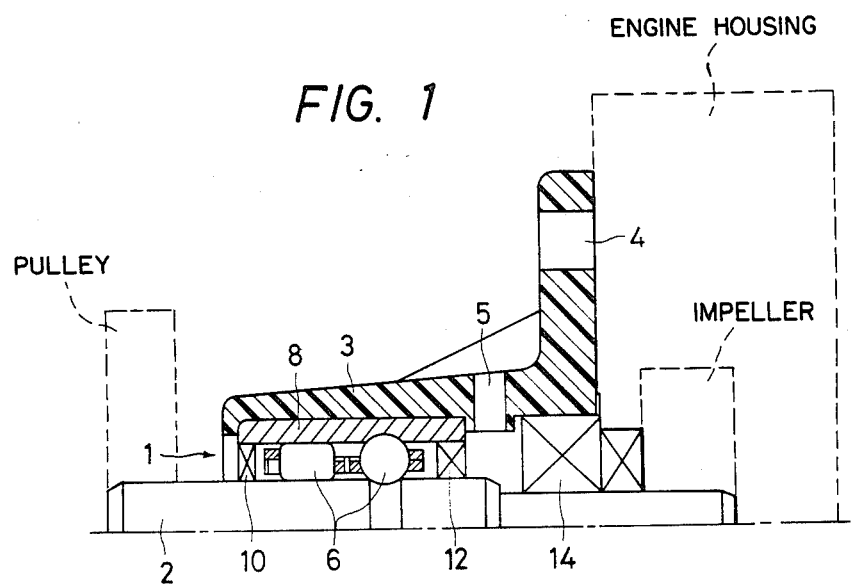
FIG. 1 is a cross-sectional view of a water pump according to a first embodiment of the present invention.

Referring to FIG. 1 which shows a first embodiment of the present invention, a rotary shaft 2 is rotatably journalled to a housing 3 through a bearing portion 1. An impeller, indicated diagrammatically by dot-dash lines, is fixedly fitted to one end of the rotary shaft 2 which extends into an engine block, and circulates the water in the engine block during rotation. A pulley, also indicated diagrammatically, is fixed to the other end of the rotary shaft 2, i.e., the end which extends out into an engine compartment. The pulley is connected to a pulley on the rotary shaft of the engine through an endless belt and therefore, as the engine rotates, the rotary shaft 2 also rotates. The rotary shaft 2 serves also as the inner race of the bearing portion 1 and provides a track for rolling member 6. It will be understood that although not shown in later described embodiments, an impeller and pulley are similarly presumed present.

An outer race 8 forming the bearing portion 1 is integrally molded with the housing 3 and provides an outer track for the rolling members 6. Seals 10 and 12 are disposed at the opposite ends of the outer race 8 to prevent entry of foreign substances such as water and dust into the bearing portion 1. A mechanical seal 14 is disposed between that portion of the housing 3 which is adjacent to the impeller and the rotary shaft 2 additionally to prevent entry of water from the pump chamber of the engine block into the bearing portion 1.

The housing 3 is integrally molded with the outer race 8, and comprises an outer shell coaxial with the rotary shaft 2 and surrounding the outside thereof, and a mounting portion for mounting the rotary shaft on the engine block. A plurality of drip holes 5 are provided between the mechanical seal 14 of the housing 3 and the seal 12. Also, the housing 3 is fixed to the engine block through a mounting hole 4 in the mounting portion.

The housing 3 is suitably formed of 6—6 nylon with glass fiber of 20-50% or carbon fiber of 5-50% mixed thereto, but may also be formed of one of other various synthetic resins such as polyamide and polyester.

Figure 2:
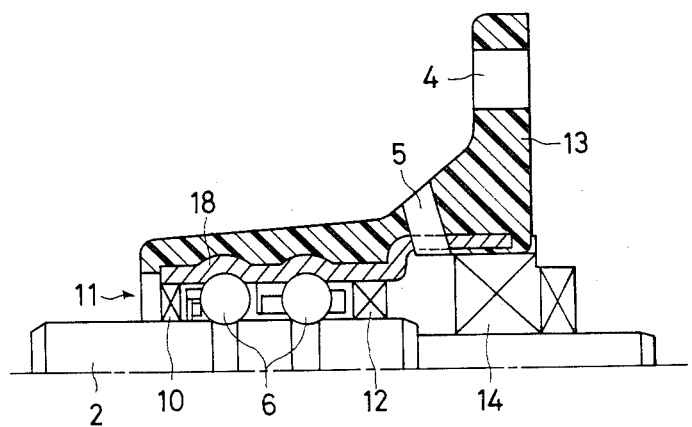
FIG. 2 is a cross-sectional view of a second embodiment of the present invention.

FIG. 2 shows a second embodiment of the present invention. In this embodiment, as compared with the first embodiment, the outer race is provided with an extending portion extending to the impeller side of the rotary shaft 2. In FIG. 2, members similar to those in FIG. 1 are given similar reference numerals and need not be described. A housing 13 is integrally molded with an outer race 18 and rotatably supports the rotary shaft 2 through rolling members 6.

The outer race 18, the rotary shaft 2 and the rolling members 6, define a bearing portion 11. The outer race 18 provides an outer track surface, and the portion of the outer race extending to the vicinity of the bearing surface on the engine block side serves also as a reinforcing member for the housing 13. Holes are formed at several locations in the extending portion and a drain hole 5 is also provided in the housing so as to discharge water which has entered between the mechanical seal 14 and the bearing seal 12.

Figure 3:
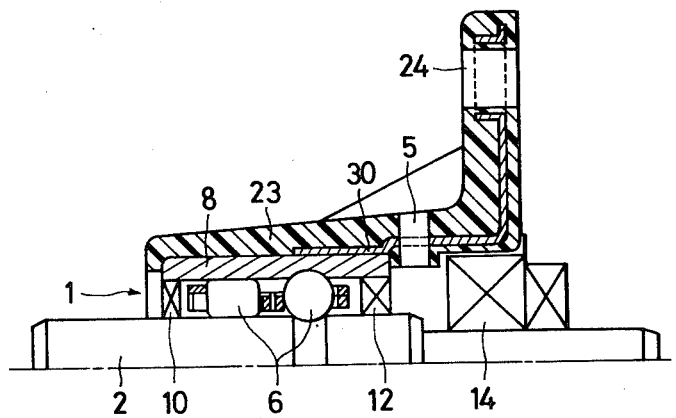
FIG. 3 is a cross-sectional view of a third embodiment of the present invention.
Figure 4:
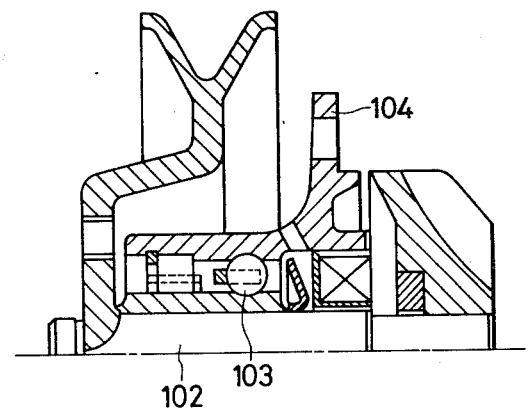
FIG. 4 is a cross-sectional view showing a water pump according to the prior art.

FIG. 3 shows a third embodiment of the present invention. In this embodiment, a reinforcing insert 30 having the extending portion of the outer race of the second embodiment as a separate member is added. The rotary shaft 2, the rolling members 6 and the outer race 8 together constitute the bearing portion 1, and a reinforcing insert 30 of substantially L-shaped cross-section is fixed to the outer race 8 by a suitable fixing method such as press-fitting and reinforces a housing 23. The reinforcing insert 30 extends toward the engine block or housing (indicated diagrammatically in dashed lines in FIG. 1) axially of the rotary shaft 2 and extends out in the direction of a right angle, namely, radially outwardly relative to the rotary shaft 2, in the vicinity of the surface thereof which bears against the engine block. A mounting hole 24 in the housing 23 is reinforced circumferentially by the reinforcing insert 30 and is of a structure which prevents loosening of a bolt after tightening and therefore, it is not necessary to insert a part such as a bushing later.

The present embodiment is of a construction in which the outer race 8 can be used regardless of variations in mounting bolt pitch or the shape of the mounting portion from vehicle to vehicle. Again in the present embodiment, as in the second embodiment, a drain hole 5 for water discharge is provided.

I claim:

1. A water pump for an engine of an automotive vehicle, comprising: a rotary pump shaft to which are fixed a drive pulley and a liquid circulating impeller for circulating engine cooling fluid on rotation of said pump shaft through said drive pulley, bearing means rotatably supporting said pump shaft and including an inner race, an outer race, and a plurality of rolling members rollingly disposed between said inner and outer races, and a separate pump housing formed of resin and molded to said outer race of said bearing means so as to be integrally attached to said outer race, whereby said pump shaft is rotatably supported within said pump housing, said outer race having a reinforcing member connected thereto which extends into and reinforces said pump housing, said pump housing having a mounting portion including means for mounting the housing to an engine with the impeller disposed to circulate cooling fluid within the engine.

2. A water pump according to claim 1, wherein said reinforcing member has a portion extending into and reinforcing said mounting portion of said pump housing.

3. A water pump according to claim 2, wherein said mounting means comprises a mounting hole and wherein said reinforcing member has a portion disposed in such a manner as to reinforce said mounting hole.

4. A water pump according to claim 1, wherein said inner race is constituted by an outer surface of said pump shaft.

5. A water pump according to claim 1, further comprising sealing means for preventing entry of foreign substances into opposite axial ends of said bearing means.

6. A water pump according to claim 1 wherein said pump housing is formed of 6—6 nylon with glass fiber of 20-50% mixed therewith.

7. A water pump according to claim 1 wherein said pump housing is formed of 6—6 nylon with carbon fiber of 5-50% mixed therewith.

8. In an automotive vehicle and the like having a liquid cooled engine, a cooling liquid pump comprising: a rotary pump shaft to which are fixed a drive pulley and a liquid circulating impeller for circulating engine cooling liquid on rotation of said pump shaft through said drive pulley, and a resinous pump housing rotatably supporting said pump shaft through bearing means and secured to a housing of said engine such that said impeller will circulate cooling liquid within said engine on rotation of said pump shaft through said drive pulley, said bearing means including an inner race, an outer race member, and a plurality of rolling members rollingly disposed between said inner race and said outer race member, with said resinous pump housing being molded to said outer race member such that said outer race member is incorporated as an integral part of said resinous pump housing, and said outer race member having a reinforcing member connected thereto which extends into and reinforces said resinous pump housing.

9. A pump according to claim 8, wherein said reinforcing member has a portion extending into and reinforcing a mounting portion of said pump housing which is secured on said engine housing.

10. A pump according to claim 8, wherein said reinforcing member reinforces a mounting hole of said mounting portion.

11. A pump according to claim 8, wherein said inner race is constituted by an outer surface of said pump shaft.

12. A pump according to claim 8, further comprising sealing means for preventing entry of foreign substances into opposite axial ends of said bearing means.

13. A pump according to claim 8, wherein said pump housing is formed of 6—6 nylon with glass fiber of 20-50% mixed therewith.

14. A pump according to claim 8, wherein said pump housing is formed of 6—6 nylon with carbon fiber of 5-50% mixed therewith.

* * * * *